(12) United States Patent
Kim

(10) Patent No.: US 6,450,443 B1
(45) Date of Patent: Sep. 17, 2002

(54) HIGH TORQUE 2.75-INCH ROCKET NOZZLE

(75) Inventor: Steven S. Kim, Crofton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/639,789

(22) Filed: Aug. 17, 2000

(51) Int. Cl.[7] .................... F42B 10/26; F42B 10/00
(52) U.S. Cl. .............. 244/3.23; 244/3.1; 239/265.15
(58) Field of Search .......................... 244/3.1, 3.23, 244/3.24–3.3, 3.22; 239/265.15, 265.11–265.14, 265.16–265.43

(56) References Cited

U.S. PATENT DOCUMENTS

| | | | |
|---|---|---|---|
| 3,260,205 A | | 7/1966 | Dietrich |
| 3,430,900 A | | 3/1969 | Turner et al. .............. 244/3.23 |
| 3,635,404 A | * | 1/1972 | Hopkins et al. ........ 239/265.15 |
| 4,203,569 A | | 5/1980 | Marks ....................... 244/3.23 |
| 4,497,460 A | | 2/1985 | Thorsted et al. ............. 244/3.3 |
| 4,562,980 A | * | 1/1986 | Deans et al. .............. 244/3.22 |
| 5,078,336 A | * | 1/1992 | Carter ....................... 244/3.22 |
| 5,511,745 A | | 4/1996 | Faupell et al. ............ 244/3.22 |
| 5,806,791 A | | 9/1998 | Hatalsky et al. ........... 244/3.24 |

FOREIGN PATENT DOCUMENTS

GB 2060078 A * 4/1981 ............. F02K/9/97

* cited by examiner

Primary Examiner—Bernarr E. Gregory
(74) Attorney, Agent, or Firm—Mark Homer

(57) ABSTRACT

A rocket spin control system for a tube launched rocket has a fixed position nozzle on the rocket and a set of internally positioned erodible or retractable vanes inside of the nozzle. The vanes are removed from the rocket propelling thrust at rocket exit from the tube.

19 Claims, 2 Drawing Sheets

HIGH TORQUE 2.75-INCH ROCKET NOZZLE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to rocket nozzles. More particularly, the rocket nozzles of the present invention possess torque vanes that are removable immediately after launch of the rocket. Most particularly, the torque vanes may be either erodible or retractable from the rocket motor exhaust after imparting sufficient rocket spin onto the rocket.

2. Brief Description of the Related Art

The 2.75-Inch rocket nozzle of the MK 66 MOD 4 Rocket Motor currently in use by the United States Navy contains flutes machined into the nozzle body of the rocket. These flutes provide a maximum torque of 3 ft.-lbs., resulting in a rocket spin rate at launcher exit of 8 Hz. Problematic with the 2.75-Inch rocket nozzle is the fact that the 3 ft.-lbs. of torque does not shut-off during the motor burn. A fin assembly on the 2.75-Inch Rocket provides an anti-spin component to the rocket to prevent the rocket motor from suffering a catastrophic reaction as it spins into its bending mode frequency.

There is a need to provide increased torque to the 2.75-Inch rocket while allowing the shutting off the torque immediately after missile launch in order to improve the precision of the rocket. The present invention addresses this and other needs.

SUMMARY OF THE INVENTION

The present invention includes a rocket spin control system for a tube launched rocket comprising a fixed position nozzle on the rocket and a set of internally positioned vanes inside of the fixed position nozzle, located aft of rocket propelling thrust, that impart rapid spin to the rocket from rocket ignition to exit of the rocket from the tube, wherein the vanes are removed from the rocket propelling thrust at rocket exit from the tube.

The present invention also includes a method for imparting a spin on a rocket comprising the steps of providing a rocket spin control system for a tube launched rocket comprising a fixed position nozzle on the rocket and a set of internally positioned vanes inside of the fixed position nozzle, located aft of rocket propelling thrust, that impart rapid spin to the rocket from rocket ignition to exit of the rocket from the tube and launching the rocket from the tube, wherein the vanes are removed from the rocket propelling thrust at rocket exit from the tube.

The present invention further includes a rapid spin rocket product produced by the method comprising the steps of providing a rocket spin control system for a tube launched rocket comprising a fixed position nozzle on the rocket and a set of internally positioned vanes inside of the fixed position nozzle, located aft of rocket propelling thrust, that impart rapid spin to the rocket from rocket ignition to exit of the rocket from the tube and launching the rocket from the tube, wherein the vanes are removed from the rocket propelling thrust at rocket exit from the tube.

The present invention improves the precision of the 2.75-Inch Rocket.

DETAILED DESCRIPTION OF THE PREFERRED EMBODIMENT

The present invention provides a high torque nozzle for the 2.75-Inch rocket system having removable vanes that are either erodible or retractable. The removable high torque vanes are internally positioned inside of the nozzle. The erodible or retractable vanes of the present invention improve the precision of the 2.75-Inch rocket system by eliminating the vanes from influencing the thrust once the rocket has left the launcher. Additionally, imprecision occurs from thrust misalignment that is due to the tolerance stack-ups at the nozzle and motor joint. The nozzle of the present invention increases the rocket spin rate at launcher exit from 8 to 40 Hz. By increasing the rocket spin rate, the thrust misalignment averages out, minimizing its precision error contribution. This high rocket motor spin rate at launch is critical in improving the rocket precision.

Figures 1, 1A:
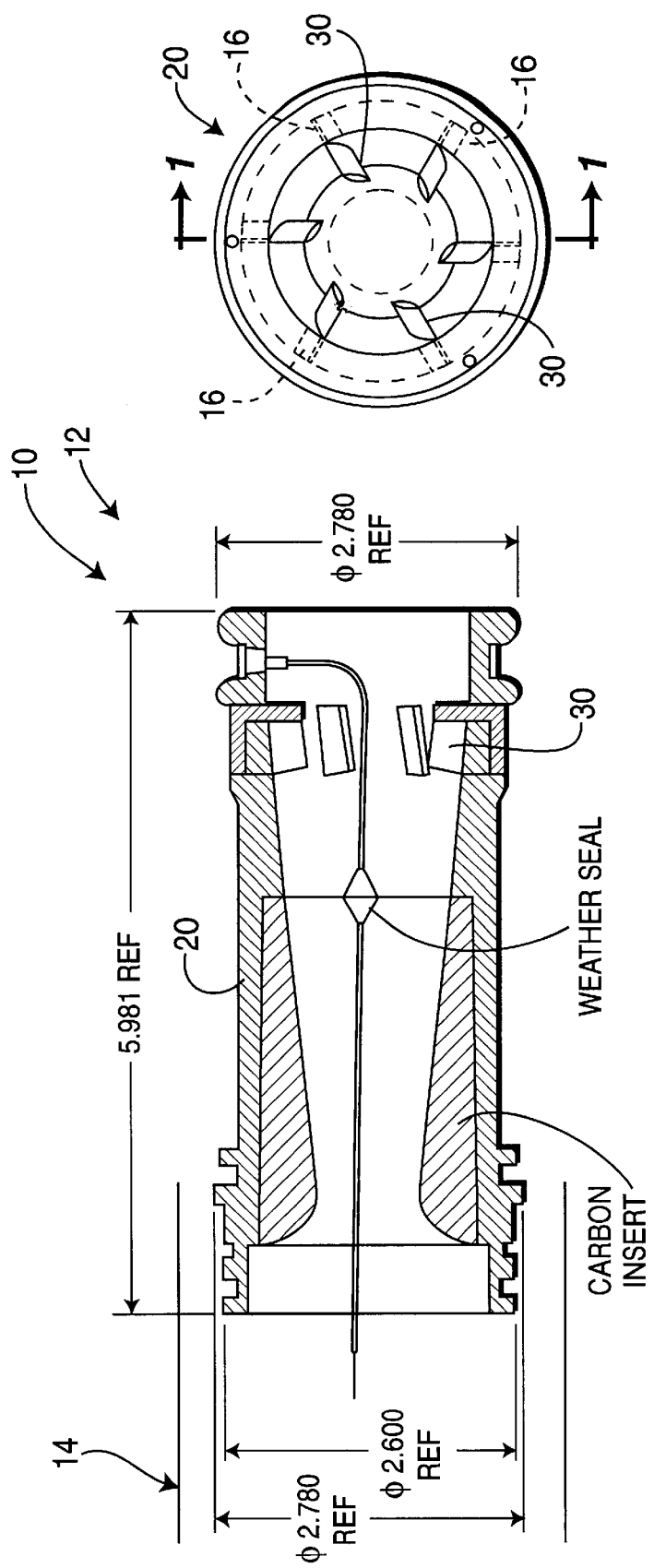
FIG. 1 is a side cross-sectional view of a rocket motor having retractable torque vanes of the present invention with FIG. 1A showing a rear view of FIG. 1; and, FIG. 2 is a side cross-sectional view of a rocket motor having erodible torque vanes of the present invention with FIG. 2A showing a rear view of FIG. 2.
Figures 2, 2A:
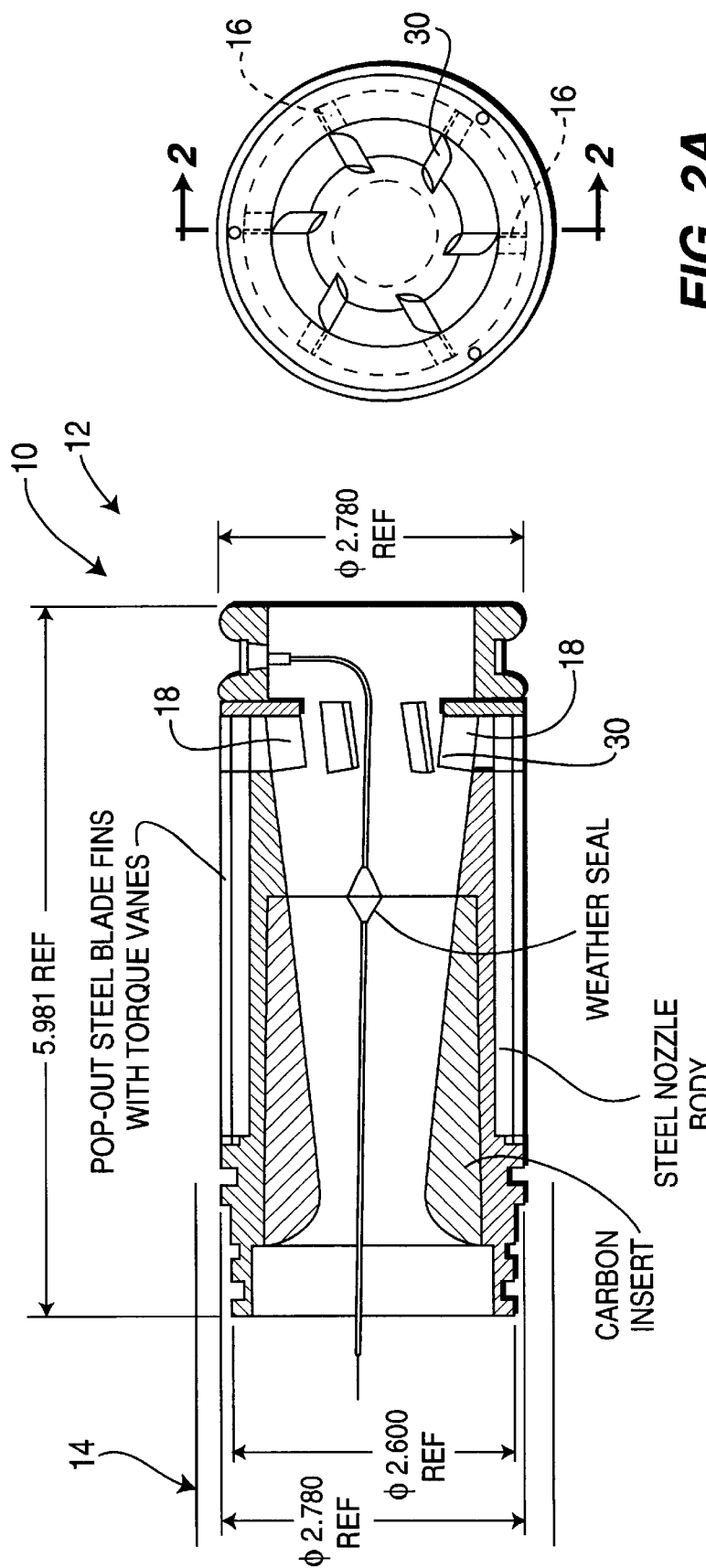

As seen in FIGS. 1 and 2, a rocket spin control system 10 for a tube launched rocket 12 of the present invention comprises a fixed position nozzle 20 on the rocket 12. Inside of the fixed position nozzle 20, and aft of the propelling thrust of the rocket 12, are a set of internally positioned removable high torque vanes 30. The removable vanes 30 comprise either erodible vanes or retractable vanes. During launch, the high torque vanes 30 impart rapid spin to the rocket 12 from rocket ignition to exit of the rocket 12 from the launch tube 14. Prior to, or concurrent with, the rocket 12 exiting the launch tube 14, the vanes 30 are removed from being influenced by the propelling thrust of the rocket 12.

Referring to FIGS. 1 and 1A, the torque vanes 30 in this preferred embodiment are removed from the propelling thrust of the rocket 12 by eroding. The erodible vanes 30 are inserted though the nozzle body of the rocket 12 for securing or anchoring the vanes 30. Individually molded torque vanes 30 are incorporated into the rocket spin control system 10. Each of the erodible vanes 30 are identical to the other removable vanes 30 in the set.

The erodible vanes 30 comprise a material and vane configuration to provide consistent torque performance. The erodible vanes 30 comprise an appropriate erodible material, preferably a thermoplastic or phenolic material such as polycarbonate or nylon. The selection of the material is determinable by those skilled in the art for a material that effectively erodes during the expected 0.07 seconds of operation of the erodible vanes 30. During launch, the erodible vanes 30 are not needed to slow the rocket spin because the torque shut-offs at launcher tube 14 exit with the removal of the vanes 30. The erodible vanes 30 may be formed integrally into the rocket 14 or inserted into the rocket nozzle 20 through slots 16. Use of the slot 16 arrangement of attachment for extending the erodible vanes 30 through the nozzle 20 body prevents ejection of the erodible vanes 30. Any appropriate number of erodible vanes 30 may be used, preferably from about 20 or less, and more preferably from about 18 to about 16 erodible vanes 30 are used.

Preferably, the erodible vanes 30 provide an average of 10 ft.-lbs. torque for 0.07 seconds, which equates to expected rocket 12 exit from the launcher. The erodible vanes 30, in combination with the nozzle 20, preferably spin the rocket to 40 Hz, which minimizes the effects of thrust misalignment. As the rocket 12 exits the launch tube 14, the rocket 12 possesses low forward velocity and minimal gyroscopic stability. Perturbation, such as thrust misalignments and side winds, have a significant influence on the rocket's flight direction. As the erodible vanes 30 shut-off the torque at launcher exit, the rocket spin rate does not exceed its first bending mode frequency (50–60 Hz) which would have a catastrophic effect on the rocket 12.

Referring to FIGS. 2 and 2A, the torque vanes 30 in this preferred embodiment are removed from the propelling thrust of the rocket 12 by retracting. Preferably, the removable vanes 30 are retracted prior to the rocket 12 exiting the tube 14. The retractable vanes 30 comprise any suitable material for influencing rocket torque and spin rate, preferably a low ablative material, and more preferably steel. The selection of the material is determinable by those skilled in the art for a material that experiences minimal ablation during the expected 0.07 seconds of operation of the retractable vanes 30. The steel retractable vanes 30 are inserted through slots 16 in the nozzle 20 body. Preferably, the slots 16 are lined with an appropriate material effective to seal against the rocket 12 exhaust, such as having rubber gaskets within the slots 16. The retractable vanes 30 are held in place with blades 18 made of a resilient material, such as steel, which are preferably spring loaded. In the open position, the steel blades 18 allow the retractable vanes 30 to retract to be flush with the inner surface of the nozzle 20 body. This prevents gas flow through the nozzle 20 body slots 16 after the retractable vanes 30 are retracted from the rocket 12 exhaust flow. This slot 16 arrangement of attachment for extending the retractable vanes 30 through the nozzle 20 body prevents ejection of the retractable vanes 30. In a preferred embodiment, the placement of the rocket 12 into the launch tube 14 forces the retractable vanes 30 through the body of the nozzle 20. As the rocket 12 leaves the launch tube 14, the combined action of the centrifugal force and spring acting on the steel blades 18 pivots the retractable vanes 30 and removes the retractable vanes 30 from the exhaust flow of the rocket 12. Any appropriate number of retractable vanes 30 may be used, preferably from about 20 or less, and more preferably from about 18 to about 16 retractable vanes 30 are used. The steel retractable vanes 30 do not retract during the 0.07 seconds that the retractable vanes 30 are exposed to the rocket 12 exhaust as the rocket 12 transits through the launch tube 14.

The removable vanes 30 impart an appropriate rocket spin and torque to the rocket as determinable by those skilled in the art. Preferably the imparted rocket spin comprises a rate of from about 20 hertz or more, more preferably from about 30 hertz or more, and most preferably from about 40 hertz to about 50 hertz. Preferably, the generated torque of the removable vanes 30 onto the rocket 12 ranges from about 10 foot-pounds or more, more preferably from about 15 foot-pounds to about 20 foot-pounds, and most preferably from about 18 foot-pounds to about 20 foot-pounds.

The dimensions of the removable vanes 30 preferably range from about 0.5 inches to about 0.7 inches in length (L), from about 0.06 inches to about 0.12 inches in width (W), and from about 0.2 inches to about 0.3 inches in depth (D). The removable vanes 30 extend approximately 0.2 inches to about 0.3 inches into the rocket nozzle 20. The removable torque vanes 30 are particularly suitable on the 2.75 inch rocket.

In operation, the rocket spin control system 10, previously described, imparts spin on the rocket 12 and removes the vanes 30 prior to, concurrent with, or immediately following, launch of the rocket 12 from the launch tube 14. Preferably the removable vanes 30 are removed prior to rocket 12 exist from the launch tube 14. Times periods for removable vanes 30 removal preferably range from about 100 milliseconds or less, and more preferably from about 80 milliseconds or less. The rapid spin produced onto rocket 12 eliminates launch imprecision that occurs from thrust misalignment of the rocket nozzle 20 and motor joint. The rapid spin minimizes the precision error contribution by averaging out the thrust misalignment. The present invention achieves higher torque capability and better torque vane attachment than previously known.

EXAMPLE 1

A precision analysis from a ground launch perspective was completed that predicted that the 2.75-Inch Rocket with erodible vanes in the rocket nozzle improved the rocket precision error from about 19-milliradians to about 5-milliradians.

EXAMPLE 2

(Prophetic)

The precision of the 2.75-Inch Rocket is improved with the incorporation of retractable vanes. With incorporation of eight retractable vanes in the nozzle of the 2.75-Inch Rocket, the rocket spin at launcher exit increases from 8 hertz to 40 hertz. The retractable vanes are inserted into the nozzle with placement of the rocket into the launch tube. The steel retractable vanes are inserted through slots in the body of the nozzle. At approximately 0.7 seconds from firing of the rocket, nozzle torque is shut-off at launcher exit. This occurs with the retractable vanes becoming flush with the inner surface of the nozzle body.

The 2.75-Inch Rocket Motor with the retractable vane is fired at a target with no effect on ballistic performance. The increased spin rate averages out thrust misalignment. The retractable vanes increase the rocket precision by approximately 360%.

EXAMPLE 3

(Prophetic)

The precision of the 2.75-Inch Rocket is improved with the incorporation of erodible vanes. With incorporation of ten erodible vanes in the nozzle of the 2.75-Inch Rocket, the rocket spin at launcher exit increase from 8 hertz to 40 hertz. The erodible vanes are inserted into the nozzle with placement of the rocket into the launch tube. The thermoplastic erodible vanes are inserted through slots in the body of the nozzle. At approximately 0.7 seconds from firing of the rocket, nozzle torque is shut-off at launcher exit. This occurs with the erodible vanes disintegrating from the heat and flow of the rocket exhaust.

The 2.75-Inch Rocket Motor with the retractable vane is fired at a target with no effect on ballistic performance. The increased spin rate averages out thrust misalignment. The erodible vanes increase the rocket accuracy by approximately 360%.

EXAMPLE 4

(Comparative)

The rocket spin rate of the 2.75-Inch Rocket was increased to over 20 Hz with a molded plastic ring with erodible torque vanes. The molded plastic ring was glued into the end of the nozzle body. The plastic ring ejected from the 2.75-Inch Rocket about 50 percent of the time, causing hazardous debris. The molded plastic ring was difficult to manufacture, particularly with regard to releasing the plastic ring from its mold.

The foregoing summary, description, examples and drawings of the invention are not intended to be limiting, but are only exemplary of the inventive features which are defined in the claims.

What is claimed is:

1. A rocket spin control system for a tube launched rocket with propelling thrust, comprising:
    a fixed position nozzle on the rocker,
    a set of internally positioned vanes inside of the fixed position nozzle, located aft of rocket propelling thrust, that impart rapid spin to the rocket from rocket ignition to exit of the rocket from the tube; and,
    means for removing the vanes, wherein the vanes are removed from the rocket propelling thrust at rocket exit from the tube.

2. The rocket spin control system of claim 1, wherein the means for removing the vanes comprises removable vanes selected from the group consisting of retractable vanes and erodible vanes.

3. The rocket spin control system of claim 2, wherein the removable vanes are retractable vanes.

4. The rocket spin control system of claim 3, wherein the retractable vanes generate a torque of from about 10 foot-pounds or more.

5. The rocket spin control system of claim 4, wherein the retractable vanes generate a torque of from about 15 foot-pounds to about 20 foot-pounds.

6. The rocket spin control system of claim 3, wherein the retractable vanes generate a torque of from about 18 foot-pounds to about 20 foot-pounds.

7. The rocket spin control system of claim 2, wherein the removable vanes are erodible vanes.

8. The rocket spin control system of claim 7, wherein the erodible vanes are formed integrally into the rocket.

9. The rocket spin control system of claim 7, wherein the erodible vanes are inserted into the rocket nozzle.

10. The rocket spin control system of claim 7, wherein the erodible vanes comprise a thermoplastic material.

11. The rocket spin control system of claim 2, wherein the removable vanes impart a rocket spin of from about 20 hertz or more.

12. The rocket spin control system of claim 11, wherein the removable vanes impart a rocket spin of from about 30 hertz or more.

13. The rocket spin control system of claim 12, wherein the removable vanes impart a rocket spin of from about 40 hertz to about 50 hertz.

14. The rocket spin control system of claim 1, wherein the rocket comprises a 2.75 inch rocket.

15. A method for imparting a spin on a rocket, comprising the steps of:
    providing a rocket spin control system for a tube launched rocket comprising a fixed position nozzle on the rocket a set of internally positioned vanes inside of the fixed position nozzle, located aft of rocket propelling thrust, that impart rapid spin to the rocket from rocket ignition to exit of the rocket from the tube, and means for removing the vanes; and,
    launching the rocket from the tube, wherein the internally positioned vanes are removed at rocket exit from the tube.

16. The method of claim 15, wherein the vanes are eroded prior to the rocket exiting the tube.

17. The method of claim 16, wherein the vanes are eroded within a time period of from about 100 milliseconds or less.

18. The method of claim 16, wherein the vanes are eroded within a time period of from about 80 milliseconds or less.

19. The method of claim 15, wherein the vanes are retracted upon the rocket exiting the tube.

* * * * *